United States Patent [19]

Tate

[11] 4,256,628

[45] Mar. 17, 1981

[54] SULFUR-FREE ACIDULATION OF TALL OIL SOAP

[75] Inventor: Dan C. Tate, Canton, N.C.

[73] Assignee: Champion International Corporation, Stamford, Conn.

[21] Appl. No.: 112,926

[22] Filed: Jan. 17, 1980

[51] Int. Cl.³ .............................................. C09F 1/02
[52] U.S. Cl. .................................. 260/97.7; 260/97.6
[58] Field of Search ................... 260/96.5, 97.7, 97.6

[56] References Cited

U.S. PATENT DOCUMENTS

| | | | |
|---|---|---|---|
| 2,374,975 | 5/1945 | Borglin | 260/97.7 |
| 3,489,740 | 1/1970 | Cholet et al. | 260/97.7 |
| 3,655,635 | 4/1972 | Sanderson | 260/97.6 |
| 4,075,188 | 2/1978 | Vardell | 260/97.7 |

*Primary Examiner*—H. S. Cockeram
*Attorney, Agent, or Firm*—Evelyn M. Sommer

[57] ABSTRACT

Tall oil soap is subjected to a sulfur-free acidulation by contacting the soap with boron trifluoride or a complex thereof, which effectively converts the soap into tall-oil without the necessity of a conventional acidification. The contacting can be carried out in any convenient fashion with an amount of boron trifluoride or complex, preferably in a range of about 20–24% based on the weight of the crude tall-oil soap.

6 Claims, No Drawings

SULFUR-FREE ACIDULATION OF TALL OIL SOAP

BACKGROUND OF THE INVENTION

In the manufacture of paper pulp, most notably by the kraft process, wood chips are subjected to the action of an alkaline liquor which attacks the non-cellulose constituents of the chips as, e.g., the fatty and resin acids, and leaches them from the cellulose. The spent liquor of this digestion process is drained from the pulp and is known as the black liquor. The black liquor is usually concentrated and allowed to settle and cool whereupon the sodium soaps of the resin and fatty acids rise to the top and are skimmed off. The skimmed off soaps are known in the trade as crude tall oil soap.

The crude tall oil soap is conventionally reacted with a strong polar acid, most usually sulfuric acid, which converts the crude tall oil soaps to their free acid form. The reaction mixture is allowed to settle and forms a crude tall oil layer, a lignin layer and a sulfate-brine layer. The lignin and sulfate-brine layers are returned to the pulp mill to recover the chemicals for use in the kraft pulping process. The crude tall oil is eventually fractionally distilled to obtain approximately equal portions of rosin acids and fatty acids and to remove the greater portion of the odor and color forming constituents.

Pulp mills have been forced in recent years to upgrade their chemical recovery systems so that there is or will be less and less sulfur loss through the stacks and effluent streams in general and it appears that the various governmental regulations mandating such recovery will be made more stringent in the future. Sulfuric acid acidification of tall oil soap introduces sulfur into the system placing an increased burden on the chemical recovery systems employed. It will accordingly be appreciated that there is a need for a system for acidification of the crude tall oil soap without the use of sulfuric acid. Various attempts for such acidification have been attempted as exemplified, e.g., by U.S. Pat. No. 4,075,188 which employs carbon dioxide in the presence of a water-immiscible solvent, but such attempts have not been commercially successful.

Accordingly, it is the object of this invention to provide a new method for the acidification of tall oil soap without introducing sulfur into the acidification system or products. This and other objects of the invention will become apparent to those skilled in the art from the following detailed description.

SUMMARY OF THE INVENTION

This invention relates to the recovery of tall oil from tall oil soap and more particularly to the conversion of the soaps to the tall oil by contact therewith with boron trifluoride or a complex thereof.

DESCRIPTION OF THE INVENTION

It has long been known that crude tall oil can be refined by treatment of the tall oil with a boron compound or complexes thereof. This is exemplified, for example, in U.S. Pat. Nos. 2,374,975 and 3,489,740. It has always been believed, however, that it was necessary to start with the crude tall oil rather than the tall oil soap. When tall oil soap was the raw material, it was believed that treatment with a suitable mineral acid, particularly sulfuric acid, prior to refining was essential. It has now been determined that contact of the crude tall oil soap with boron trifluoride or a complex thereof effectively converts the soap into tall oil without the necessity of an acidification step and without the introduction of sulfur into the system. It has further been determined that the contacting of the tall oil soap with the boron trifluoride can be carried out in weak black liquor, intermediate black liquor and heavy or strong black liquor and although preferable, it is not necessary to separate the soap from the black liquor.

The process is carried out in the presence of water but the soap need not be diluted with water since it usually contains a sufficient amount of occluded water therein. The contacting can be carried out at ambient temperature or, if desired, with applied heat up to about the boiling point of water. The reaction is generally allowed to continue until completion which usually requires 60 minutes or less.

The boron trifluoride can be employed as such or as a complex thereof. Usable complexes include those with nitrogen containing compounds such as amines, amides, urea, nitriles, ammonia and the like as illustrated by urea, hexamethylenediamine, diethylamine and triethylamine. Non-nitrogen containing complexes such as furfural and etherates can also be used. Since it is the object of this invention to provide a sulfur-free acidulation, the complexing agent should, of course, also be sulfur-free. The boron trifluoride or complex can be employed in any convenient form, i.e., as a gas or liquid. The contacting of the crude tall oil soap and boron trifluoride or complex can be carried out in any convenient fashion and the amount of boron trifluoride or complex is not particularly restricted but is preferably in a range of about 20–24% based on the weight of the crude tall oil soap.

In order to demonstrate the applicability of the present invention, 300 ml of water were mixed with 214 grams of unwashed tall oil soap and then 45 grams of gaseous boron trifluoride was added to the mixture over a 40 minute period. During this time, the temperature increased from room temperature to 64° C. The normality of the spent acid or brine was 3. An analysis of the recovered oil showed it had an acid number of 174, 46% resins acids, a saponification number of 176, 7.4% unsaponifiables and an oil yield of 50.9%.

The applicability of the invention was also demonstrated by adding 70 ml of boron trifluoride etherate to an agitated 206 grams of pulp plant soap for a 40 minute period. The resulting material was allowed to settle and the normality of the spent acid or brine was 4.1. The tall oil was recovered and analyzed. It was found that the oil yields was 53%, the unsaponfiables were 6.14% and the resin acids were 46.5%. The acid number of the analyzed oil was 175 and the saponification number was 176.

Various changes and modifications can be made in the process of this invention without departing from the spirit and scope thereof. The various embodiments disclosed herein were for the purpose of further illustrating the invention but were not intended to limit it.

I claim:

1. In a method for the conversion of tall oil soap to tall oil comprising acidulating the tall oil soap, permitting the resulting reaction mixture to settle to form a tall oil layer, a lignin layer and a spent acid or brine layer and recovering the tall oil layer, the improvement which comprises acidulating the tall oil soap by contacting said soap with boron trifluoride or a sulfur-free complex thereof.

2. The method of claim 1 wherein said tall oil soap is contacted with boron trifluoride.

3. The method of claim 1 wherein said tall oil soap in contacted with a complex of boron trifluoride.

4. The method of claim 3 wherein said complex is boron trifluoride etherate.

5. The method of claim 1 wherein the amount of said boron trifluoride or complex is about 20–24% based on the weight of said tall oil soap.

6. The method of claim 1 wherein said tall oil soap is separated from the black liquor of a paper pulp mill prior to said contacting.

* * * * *